(12) United States Patent
Yamanaka et al.

(10) Patent No.: US 11,058,970 B2
(45) Date of Patent: Jul. 13, 2021

(54) VISE FOR COLUMN AND COLUMN SYSTEM FOR CHROMATOGRAPHY

(71) Applicant: JNC CORPORATION, Tokyo (JP)

(72) Inventors: Naoki Yamanaka, Kanagawa (JP); Masami Todokoro, Tokyo (JP)

(73) Assignee: JNC CORPORATION, Tokyo (JP)

( * ) Notice: Subject to any disclaimer, the term of this patent is extended or adjusted under 35 U.S.C. 154(b) by 266 days.

(21) Appl. No.: 16/293,652

(22) Filed: Mar. 6, 2019

(65) Prior Publication Data
US 2019/0275445 A1    Sep. 12, 2019

(30) Foreign Application Priority Data
Mar. 6, 2018  (JP) .............................. JP2018-039433

(51) Int. Cl.
| | | |
|---|---|---|
| *B01D 15/22* | (2006.01) | |
| *B01D 15/10* | (2006.01) | |
| *G01N 30/02* | (2006.01) | |
| *G01N 30/60* | (2006.01) | |

(52) U.S. Cl.
CPC .............. *B01D 15/22* (2013.01); *B01D 15/10* (2013.01); *G01N 30/02* (2013.01); *G01N 30/6004* (2013.01); *G01N 30/6026* (2013.01); *G01N 30/6047* (2013.01); *G01N 30/6091* (2013.01)

(58) Field of Classification Search
CPC ........ B01D 15/10; B01D 15/22; G01N 30/02; G01N 30/6004; G01N 30/6026; G01N 30/6047; G01N 30/6091
See application file for complete search history.

(56) References Cited

U.S. PATENT DOCUMENTS

| | | | |
|---|---|---|---|
| 4,350,595 A | 9/1982 | Gunkel | |
| 4,451,364 A * | 5/1984 | Higgins | ............. G01N 30/6026 210/198.2 |
| 4,451,365 A | 5/1984 | Sattler et al. | |
| 5,238,556 A | 8/1993 | Shirkhan | |
| 2007/0175809 A1* | 8/2007 | Cao | ................... G01N 30/6026 210/198.2 |
| 2009/0230045 A1* | 9/2009 | Kaneko | ............. G01N 30/6091 210/198.2 |
| 2010/0154207 A1 | 6/2010 | Ford et al. | |

FOREIGN PATENT DOCUMENTS

| | | |
|---|---|---|
| EP | 3054294 | 8/2016 |
| JP | 2005114460 | 4/2005 |

OTHER PUBLICATIONS

"Search Report of Great Britain Counterpart Application", dated Aug. 29, 2019, pp. 1-4.

* cited by examiner

*Primary Examiner* — Benjamin L Lebron
(74) *Attorney, Agent, or Firm* — JCIPRNET

(57) ABSTRACT

A vise for column, for attaching a plug to a column tube of a column for chromatography comprising the column tube and the plug to be attached to one end of the column tube, is provided. The vise comprises a column supporter configured to be able to support a part of the column for chromatography, a main body configured to be connected to the column supporter and extending from the column supporter by a predetermined distance, and a column presser configured to be supported at another end of the main body opposite to one end to which the column supporter is connected, and configured to be movable toward and away from the column supporter, and configured to be able to press the plug against the column tube.

9 Claims, 11 Drawing Sheets

US 11,058,970 B2

VISE FOR COLUMN AND COLUMN SYSTEM FOR CHROMATOGRAPHY

CROSS-REFERENCE TO RELATED APPLICATION

This application claims the priority benefit of Japan application no. 2018-039433, filed on Mar. 6, 2018. The entirety of each of the above-mentioned patent applications is hereby incorporated by reference herein and made a part of this specification.

BACKGROUND OF THE INVENTION

Field of the Invention

The present invention relates to a vise for a column, and a column system to be used for a column for chromatography.

Description of the Related Art

Conventionally, disposable columns for chromatography have been known. A column includes a syringe-type tubular container, and a holder. The syringe-type tubular container has one open end, a solution outlet at the other end, and filters attached to both the ends in the inside thereof, and carries a filler for liquid chromatography in the inside. The holder includes a tubular section enclosing the syringe-type tubular container, and two unions attached to both ends of the tubular section. The unions have male-threaded outer circumferences, and are placed to hold the syringe-type tubular container therebetween and joined to the female-threaded tubular section. The syringe-type tubular container is secured with the unions by tightening the unions on both the ends. The unions secure the positions of the filters, and allow the column to be connected to a chromatography system (see Japanese Patent Laid-Open No. 2005-114460).

However, the column is composed of the syringe-type tubular container and the holder, and further the tubular container storing the filler is enclosed by the holder with a space between the holder and the outer circumference of the tubular container, and therefore the overall volume is larger and heavier relative to the contents, handling is complicated, and the cost of the column rises because of an increased number of parts. Furthermore, since Japanese Patent Laid-Open No. 2005-114460 discloses the disposable column, reusing the syringe-type tubular container and the holder is not preferable from the viewpoint of contamination.

The present invention has been made to provide a vise for a reusable column without increasing the cost of the column, and a column system for chromatography including the vise for a reusable column.

SUMMARY OF THE INVENTION

The present invention includes [1] and [12] below.
[1] A vise for column, for attaching a plug to a column tube of a column for chromatography comprising the column tube and the plug to be attached to one end of the column tube, the vise comprising: a column supporter configured to be able to support a part of the column for chromatography; a main body configured to be connected to the column supporter and extending from the column supporter by a predetermined distance; and a column presser configured to be supported at another end of the main body opposite to one end to which the column supporter is connected, and configured to be movable toward and away from the column supporter, and configured to be able to press the plug against the column tube.

[12] A column system for chromatography comprising: a column for chromatography comprising a column tube and a plug to be attached to one end of the column tube; and a vise for column, comprising a column supporter configured to be able to support a part of the column, a main body configured to be connected to the column supporter and extend from the column supporter by a predetermined distance, and a column presser configured to be supported by the main body at an end which is not connected to the column supporter, and configured to be movable toward and away from the column supporter, and configured to be able to press the plug against the column tube.

DETAILED DESCRIPTION OF THE PREFERRED EMBODIMENT

Figure 1:
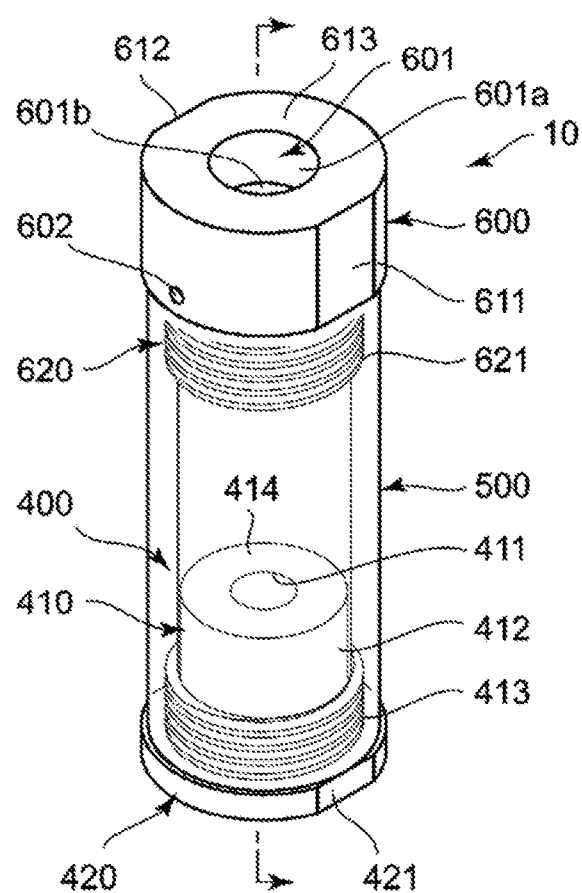
FIG. 1 is a perspective view of a vise for column.
Figure 2:
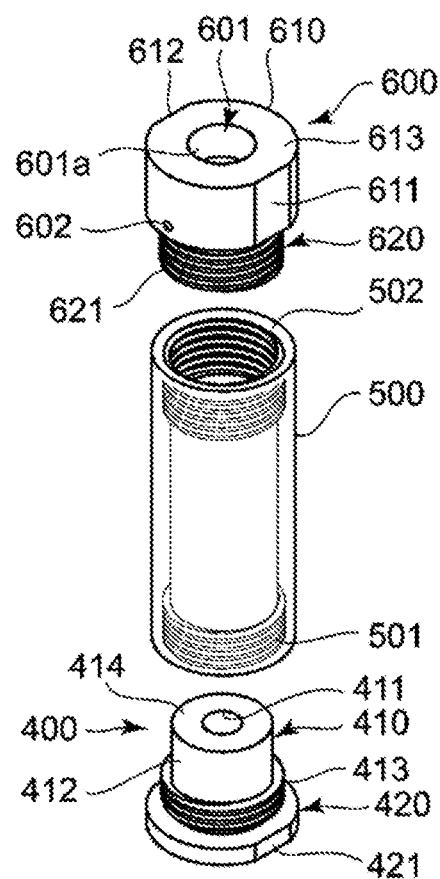
FIG. 2 is a perspective exploded view of the vise for column.
Figure 3:
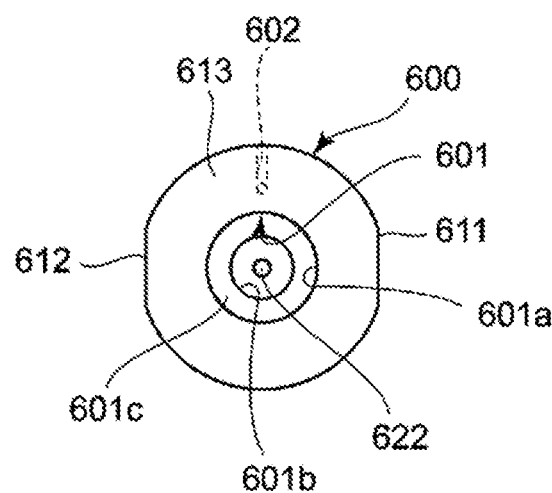
FIG. 3 is a plan view of the vise for column.

Hereinafter, a vise 10 for column according to the present invention will be described using FIGS. 1 to 3.
The vise 10 for column comprises mainly a bottom cap 400 forming a column supporter, a vise tube 500 forming a main body, and a top cap 600 forming a column presser.
The vise tube 500 is in the form of a colorless transparent cylinder made of an acrylic resin. On the inner circumferential surfaces at both ends in the axial direction of the cylinder, female threads 501, 502 are cut from the edge to a predetermined depth.
The bottom cap 400 is made of polyoxymethylene, for example, and comprises mainly a supporting main body 410 and a flange 420. The supporting main body 410 is in the form of a cylinder with a bottom, and has mutually coaxial cylindrical inner circumferential surface 411 and outer circumferential surface 412. The diameter of the outer circumferential surface 412 is shorter than the diameter of the inner circumferential surface of the vise tube 500 to such an extent that the supporting main body 410 is inserted with a margin into the inner circumferential surface of the vise tube 500. On the outer circumferential surface 412, a male thread 413 is cut near the flange 420. The inner circumferential surface 411 forms a hole having a bottom. The flange 420 is in a substantially disk form connected coaxially to the bottom of the supporting main body 410. The diameter of the substantially disk form is longer than the diameter of the outer circumference of the vise tube 500. Moreover, the outer circumference of the flange 420 has bottom tool-engagement faces 421 formed by being cut along mutually parallel two planes parallel to the axial direction.

The top cap 600 is made of polyoxymethylene, for example, and comprises mainly a top body section 610 and a top engagement section 620. The top body section 610 is in the form of a substantially cylindrical column. The diameter of the outer circumference of the top body section 610 is longer than the diameter of the outer circumference of the vise tube 500. The outer circumference of the top body section 610 has top tool-engagement faces 611, 612 formed by being cut along mutually parallel two planes parallel to the axial direction. The top engagement section 620 is in the form of a substantially cylindrical column, and has a male thread 621 cut on the outer circumference of the top engagement section 620. The axial length of the male thread 621 is equal to or longer than an insertion length of a first plug 200 to be inserted into a later-described first column tube 100 and an insertion length of a second plug 900 to be inserted into a second column tube 800. The top body section 610 and the top engagement section 620 are coaxially connected to each other along the axial direction. The inner circumference of the top cap 600 is provided with a counterbored hole 601. The counterbored hole 601 is composed of an enlarged diameter section 601a that opens on a top surface 613 of the top body section 610, and a reduced diameter section 601b with a shorter inner circumferential diameter than that of the enlarged diameter section 601a (see FIG. 3). The inner circumferential diameters of the enlarged diameter section 601a and the reduced diameter section 601b are uniform over the entire axial length. The counterbored hole 601 does not penetrate the top cap 600 in the axial direction, and the bottom surface of the counterbored hole 601, that is, the bottom surface of the reduced diameter section 601b has a predetermined distance in the axial direction from the bottom of the top engagement section 620. The counterbore depth, that is, the axial length of the enlarged diameter section 601a is shorter than the axial length of the top body section 610. A drain hole 622 is provided to pierce the bottom surface of the counterbored hole 601 and the bottom surface of the top cap 600 (see FIG. 3). Furthermore, an air hole 602 is provided to pierce from the side surface of the top body section 610 to the bottom surface of the top engagement section 620. The air hole 602 has an L-shaped cross section in a cross section including the axis of the top cap 600.

The bottom cap 400 is screwed into the bottom of the vise tube 500, and the top cap 600 is screwed into the top section, thereby forming the vise 10 for column. In this state, the vise tube 500 extends by only a predetermined distance from the bottom cap 400 to the top cap 600, and the top cap 600 is supported at another end of the vise tube 500 opposite to one end to which the bottom cap 400 is connected. The bottom cap 400 and the top cap 600 are axially movable by being turned with respect to the vise tube 500.

Next, a first column 20 that is a column for chromatography having a capacity of 1 mL will be described using FIGS. 4 and 5. The first column 20 is made of a resin, and comprises mainly a tubular first column tube 100, a first plug 200, a first filter 126, a second filter 127, and a stopper 310.

The first column tube 100 comprises mainly a first storage section 110 in the form of a cylinder with a bottom, and a cylindrical bottom-side connecting section 130 connected to the bottom of the first storage section 110. The first storage section 110 and the bottom-side connecting section 130 are coaxially arranged.

The first storage section 110 comprises mainly a securing rib 112, a first plug connecting section 114, a receptacle 113, and a hole 118.

The securing rib 112 is provided on an outer circumferential surface 111 of the first storage section 110 and protrudes radially outward from the outer circumferential surface 111 over the entire circumference of the outer circumferential surface 111. A cross section of the securing rib 112, taken along a plane including an axis Z of the first column tube 100, shows a shape having a diameter that increases moderately toward the bottom-side connecting section 130 and then decreases rapidly (see FIG. 5).

The inner circumference of the first storage section 110 is composed of the first plug connecting section 114 and the receptacle 113. The first plug connecting section 114 is a cylindrical inner circumferential surface provided up to a position located at a predetermined distance inward from an opening 120 of the first storage section 110 along the axis Z, and has a diameter that decreases gradually with an increase in the distance from the opening 120. The receptacle 113 has a cylindrical shape, and is provided from the edge of the first plug connecting section 114 to a bottom surface 117 along the axis Z. The inner diameter of the first plug connecting section 114 is longer than the inner diameter of the receptacle 113.

The hole 118 is a hole that opens on the bottom surface 117 of the first storage section 110, and is on the axis Z of the first column tube 100 and penetrates from the bottom surface 117 to the inner circumference of the bottom-side connecting section 130.

The bottom-side connecting section 130 comprises four reinforcing ribs 132 which are provided on an outer circumferential surface 131, and a bottom-side cylinder section 133, a bottom-side widened section 134 and a bottom-side female threaded section 135 which are provided on the inner circumferential surface. The reinforcing ribs 132 are arranged at equal intervals in the circumferential direction of the outer circumferential surface 131, and extend along the axis Z. The outer circumferential diameters of the first storage section 110 and the bottom-side connecting section 130 are substantially the same and are smaller than the diameters of the enlarged diameter section 601a and the inner circumferential surface 411 of the supporting main body 410.

The bottom-side cylinder section 133 is coaxial with the hole 118 and has an outer diameter longer than the inner diameter of the hole 118. The bottom-side widened section 134 has a truncated cone shaped side surface, and is provided between the bottom-side cylinder section 133 and the bottom-side female threaded section 135. On the inner circumferential surface of the bottom-side female threaded section 135, a female thread conforming to existing standards, or having different pitch, internal diameter and valley diameter from existing standards, is cut.

Figure 5:
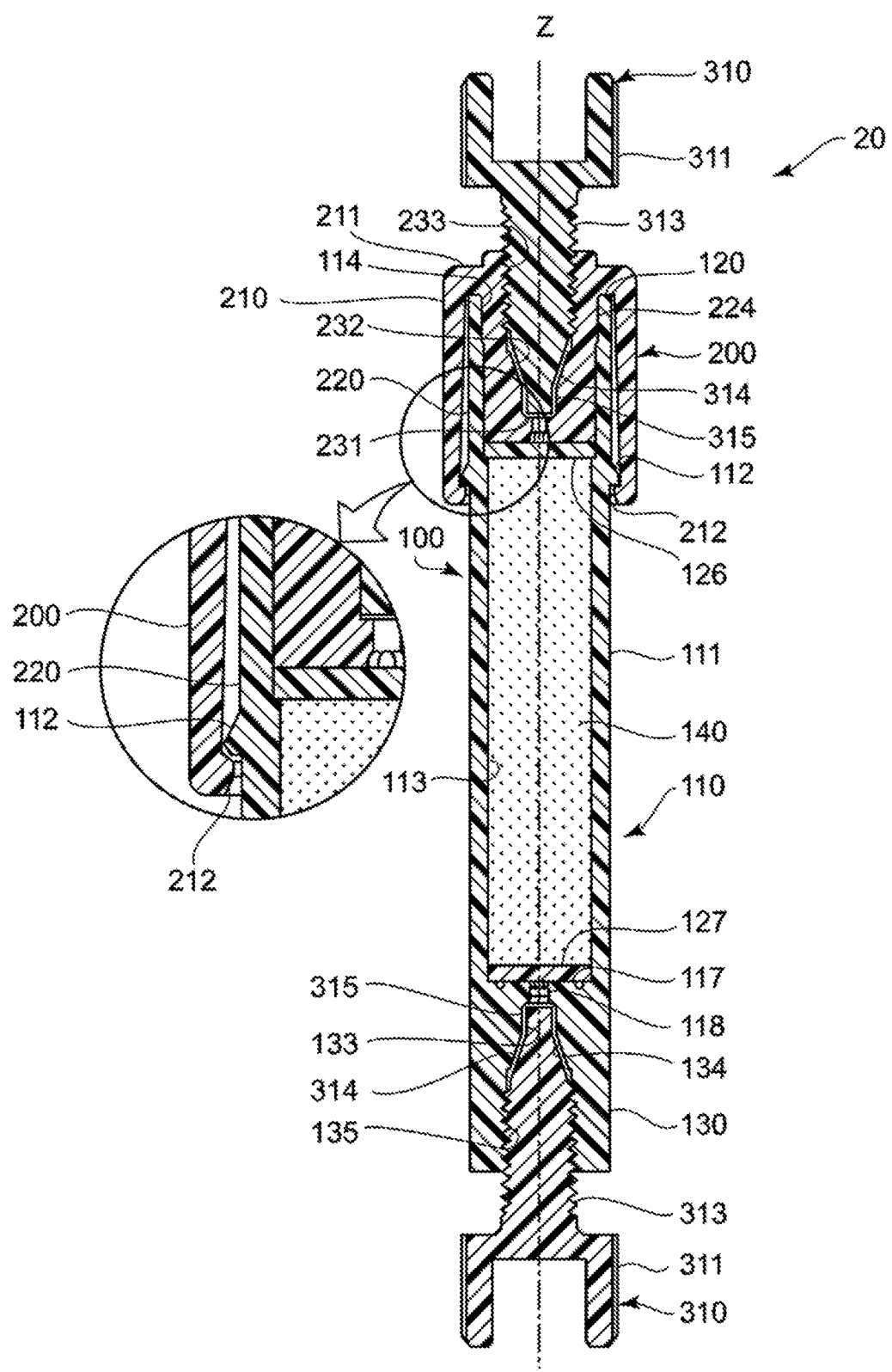
FIG. 5 is a cross-sectional view of the first column, taken along a plane including the axis Z.

Referring to FIG. 5, the first plug 200 comprises mainly an outer cylindrical section 210 in the form of a cylinder and an inner cylindrical section 220 arranged coaxially on the inner circumferential side of the outer cylindrical section 210. The outer cylindrical section 210 is connected to the inner cylindrical section 220 via a top section 211 extending from one end of the outer cylindrical section 210 to the inner circumferential side.

The outer cylindrical section 210 has a hook 212 protruding radially inward from the inner circumferential surface of a protruding end thereof. The hook 212 protrudes along the inner circumferential surface of the outer cylindrical section 210 while missing partially. A cross section of the hook 212, taken along a plane including the axis Z of the first plug 200, shows a shape having a diameter that increases rapidly as being more distant from the top section 211 and then decreases gradually (see FIG. 5).

The inner cylindrical section 220 comprises an outer circumferential surface 224 with a diameter decreasing toward the protruding end, and a plug cylindrical section 231, a plug widened section 232 and a plug female threaded section 233 which are provided on the inner circumferential surface of the inner cylindrical section 220.

The outer circumferential surface 224 is in the form of a cylinder with a diameter decreasing gradually as being more distant from the top section 211, and has a shape corresponding to the first plug connecting section 114.

The plug cylindrical section 231 is a hole coaxial with the axis Z. The plug widened section 232 has a truncated cone shaped side surface, and is provided between the plug cylindrical section 231 and the plug female threaded section 233. Similarly to the bottom-side female threaded section 135, a female thread conforming to existing standards, or having different pitch, inner diameter and valley diameter from existing standards, is cut on the inner circumferential surface of the plug female threaded section 233. In short, the structure of the plug cylindrical section 231 is similar to that of the bottom-side cylinder section 133, the structure of the plug widened section 232 is similar to that of the bottom-side widened section 134, and the structure of the plug female threaded section 233 is similar to that of the bottom-side female threaded section 135.

The first filter 126 and the second filter 127 are columnar filters having such a density that does not allow passage of a filler 140. The outer diameters of the first filter 126 and the second filter 127 are substantially the same as the inner diameter of the receptacle 113. The second filter 127 is inserted from the opening 120 before the filler 140 is stored in the first column tube 100 and closely attached to the bottom surface 117. The first filter 126 is inserted from the opening 120 after the filler 140 is stored in the first column tube 100.

Figure 4:
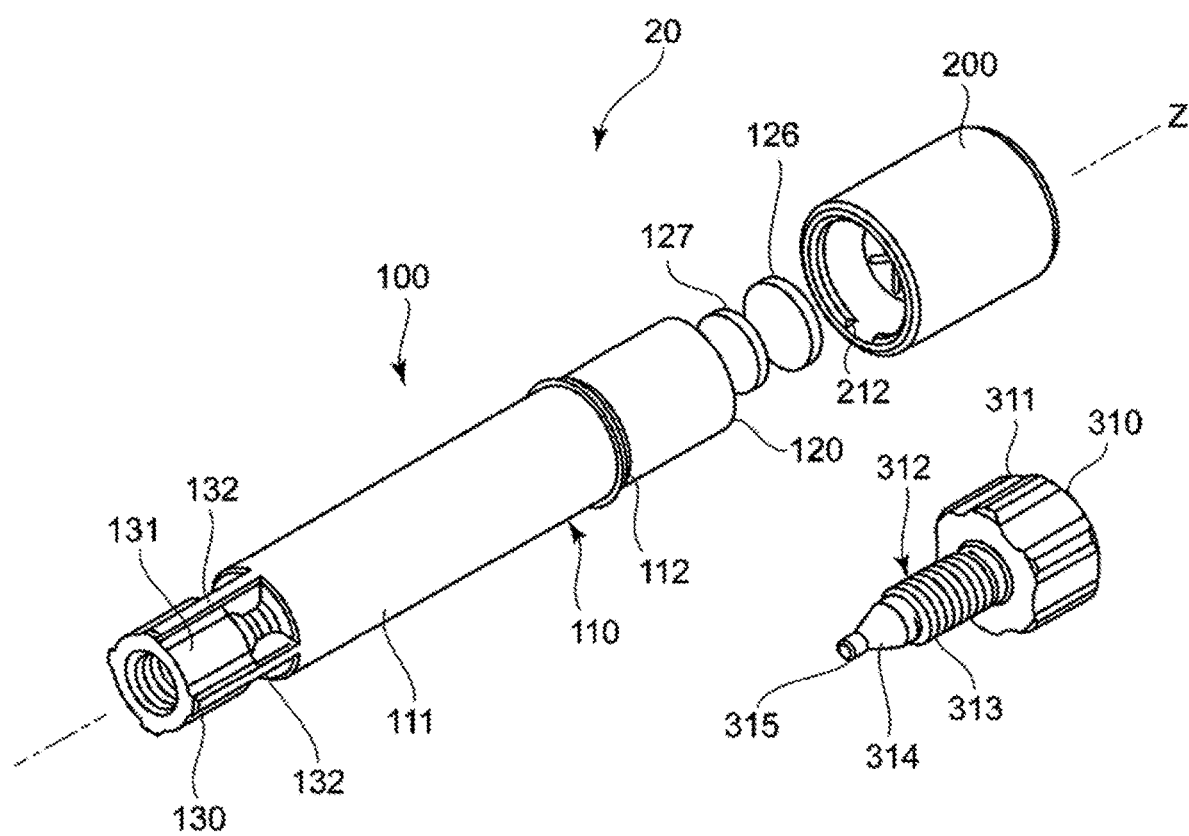
FIG. 4 is a perspective exploded view of a first column.

Referring to FIGS. 4 and 5, the stopper 310 comprises mainly a stopper grip section 311, and a stopper insertion section 312. The stopper grip section 311 is in a substantially cylindrical form, and has an outer circumference of such a length that allows a user to hold the stopper grip section 311 with fingers. The diameter of the outer circumference of the stopper grip section 311 is slightly shorter than the outer circumferential diameter of the reduced diameter section 601b of the top cap 600, and when the stopper grip section 311 is inserted into the reduced diameter section 601b, the stopper grip section 311 and the reduced diameter section 601b are engaged with each other and do not move in the radial direction. The diameter of the outer circumference of the stopper grip section 311 is shorter than the diameter of the inner circumferential surface 411 of the bottom cap 400, and when the stopper grip section 311 is inserted into the inner circumferential surface 411, the stopper 310 is insertable and movable in the inner circumferential surface 411.

The stopper insertion section 312 comprises mainly a first stopper insertion portion 313, a second stopper insertion portion 314 and a third stopper insertion portion 315 which are provided on the outer circumferential surface of the stopper insertion section 312. The first stopper insertion portion 313 has an outer diameter slightly longer than the inner diameter of the bottom-side cylinder section 133 and is insertable into the bottom-side cylinder section 133. The second stopper insertion portion 314 has an outer diameter slightly longer than the inner diameter of the bottom-side widened section 134 and is insertable into the bottom-side widened section 134. The third stopper insertion portion 315 has a male thread capable of being screwed with the bottom-side female threaded section 135. The first stopper insertion portion 313 also functions similarly with respect to the plug cylindrical section 231, the plug widened section 232, and the plug female threaded section 233.

Figure 6:
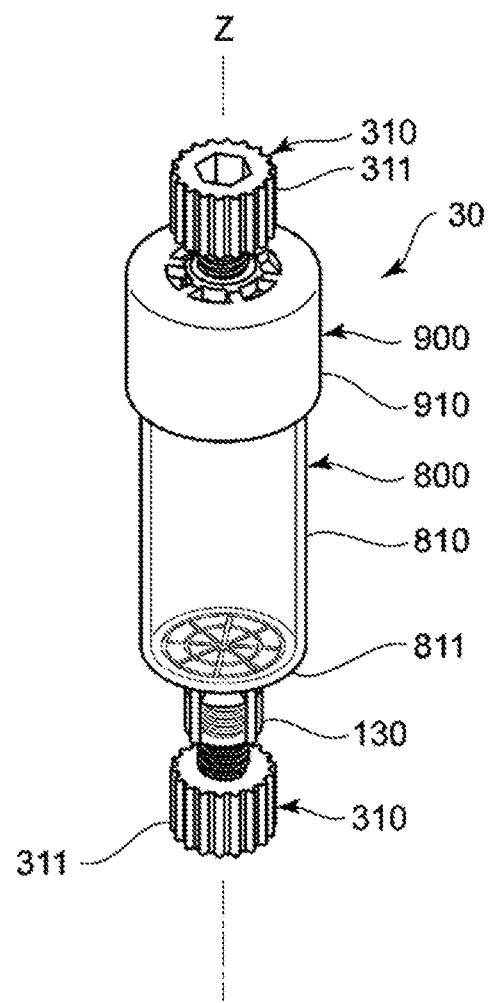
FIG. 6 is a perspective view of a second column.
Figure 7:
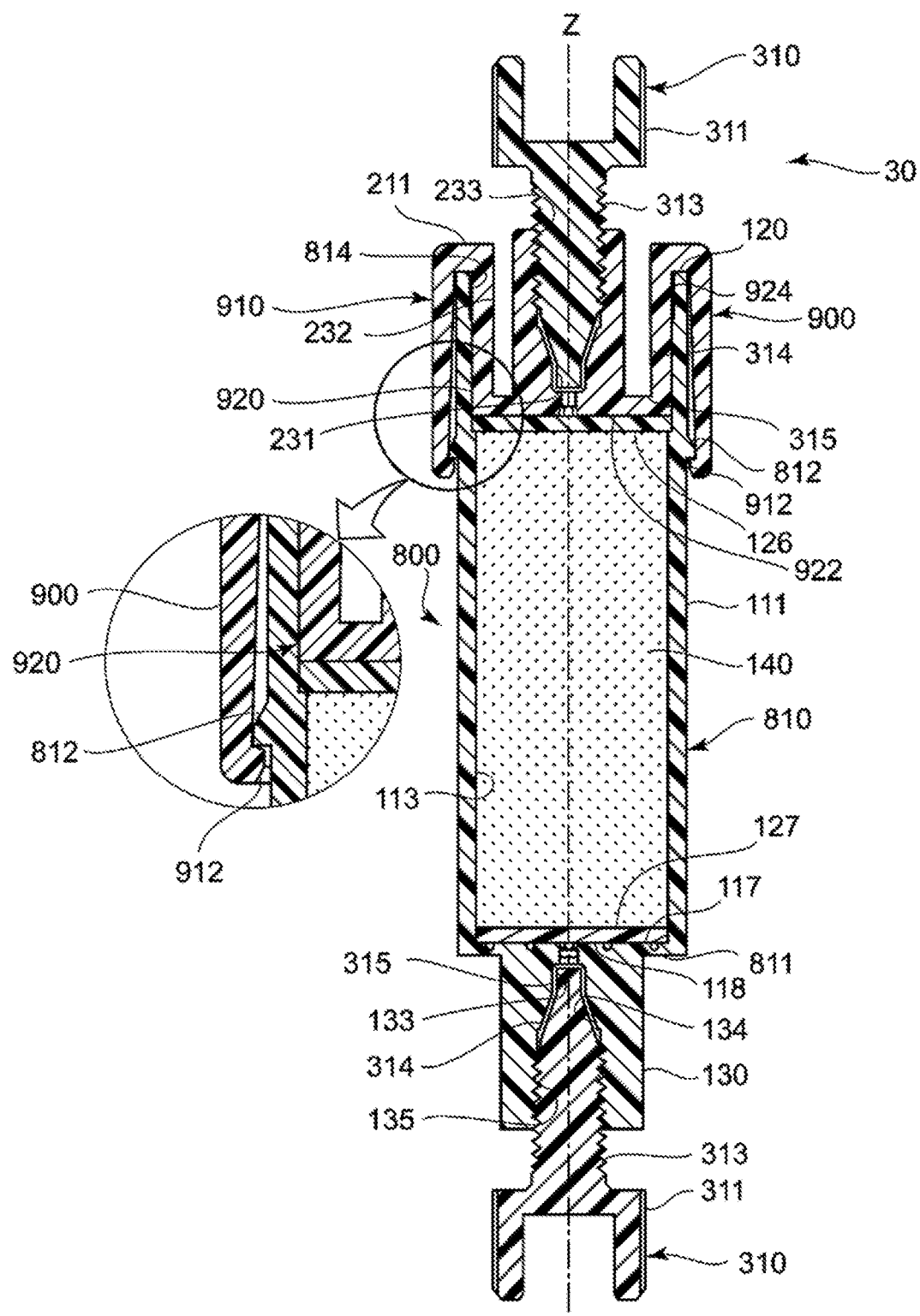
FIG. 7 is a cross-sectional view of the second column, taken along a plane including the axis Z.

Next, a second column 30 that is a column for chromatography having a capacity of 5 mL will be described using FIGS. 6 and 7. The same structures as those of the first column 20 are labelled with the same reference numerals, and description will be omitted.

The second column 30 is made of a resin, and comprises mainly a tubular second column tube 800, a second plug 900, the first filter 126, the second filter 127, and the stopper 310. Regarding the first filter 126, the second filter 127 and the stopper 310, description will be omitted.

The second column tube 800 comprises mainly a second storage section 810 in the form of a cylinder with a bottom, and the substantially cylindrical bottom-side connecting section 130 connected to the bottom of the second storage section 810. The second storage section 810 and the bottom-side connecting section 130 are arranged coaxially and connected to each other.

The second storage section 810 has an inner diameter and an outer diameter longer than those of the first storage section 110. On the other hand, both the first column tube 100 and the second column tube 800 have the same outer diameter of the bottom-side connecting section 130. Therefore, the outer diameter of the second storage section 810 is shorter than the outer diameter of the bottom-side connecting section 130. Consequently, a step, namely a bottom surface 811, is formed at the connection between the second storage section 810 and the bottom-side connecting section 130.

The diameter of the outer circumference of the second storage section 810 is longer than the diameters of the enlarged diameter section 601a and the reduced diameter section 601b of the top cap 600, and is longer than the diameter of the inner circumferential surface 411 of the bottom cap 400. Thus, the bottom surface 811 of the second storage section 810 can be loosely fit on the top surface 613 of the top cap 600 and a top surface 414 of the bottom cap 400. The diameter of the outer circumference of the bottom-side connecting section 130 is shorter than the diameters of the enlarged diameter section 601a and the reduced diameter section 601b and the diameter of the inner circumferential surface 411. Consequently, the bottom-side connecting section 130 can be loosely fit into the enlarged diameter section 601a, the reduced diameter section 601b, and the inner circumferential surface 411.

Further, the second plug 900 has a shape corresponding to the inner diameter and the outer diameter of the second storage section 810. That is, the diameter of the outer circumference of an outer circumferential surface 924 of an inner cylindrical section 920 is such a length that allows engagement with a second plug connecting section 814. The inner diameter of an outer cylindrical section 910 is such a length that allows loose fitting on the outer circumference of the second storage section 810, and the inner diameter of a hook 912 is such a length that allows secure engagement with a securing rib 812. Regarding these members, since the shapes other than the inner diameters and the outer diameters are the same as those of the first column 20, description will be omitted.

Figure 8:
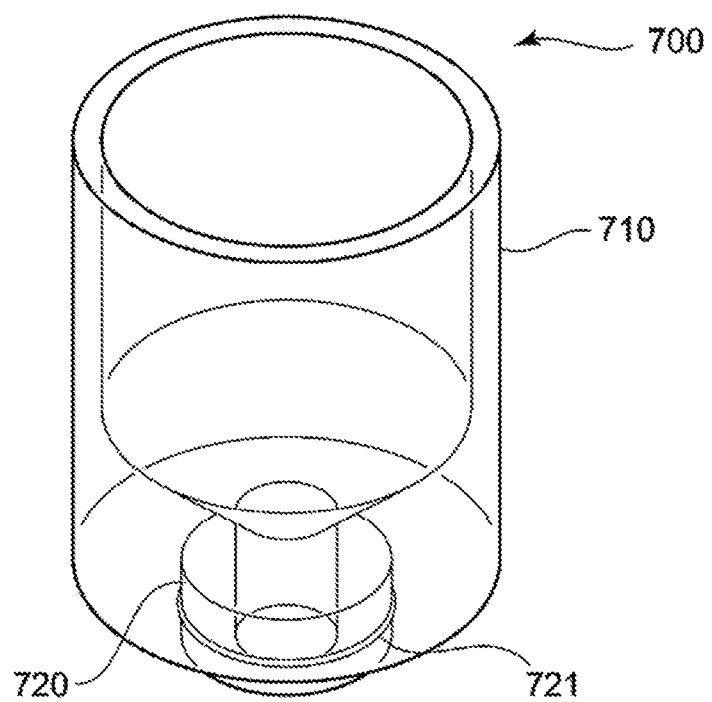
FIG. 8 is a perspective view of a packer.

A packer 700 will be described using FIG. 8. The packer 700 is a funnel for packing the filler 140 in the first receptacle 110 or the second storage section 810, and comprises cylindrical packer upper section 710 and packer lower section 720. The packer upper section 710 has an inner diameter longer than the inner diameter of the first storage section 110 or the second storage section 810, and has a conical recessed bottom. This bottom is connected to the inner circumference of the packer lower section 720. The packer lower section 720 is provided with an O-ring 721 attached to the outer circumferential surface. When the packer lower section 720 is inserted into the first storage section 110 or the second storage section 810, the O-ring 721 contacts the inner circumferential surface of the first storage section 110 or the second storage section 810, thereby securing water tightness at the connection between the packer 700 and the storage section 110, or the second storage section 810, and preventing leakage of the filler 140 from the connection.

A column system for chromatography is formed by the vise 10 for column and the first column 20 and/or the second column 30. The column system for chromatography may include the packer 700.

A procedure of assembling the second column 30 will be described using FIGS. 9 to 13.

First, the stopper 310 is screwed into the bottom-side connecting section 130 of the second column 30, thereby closing the inner circumferential surface of the bottom-side connecting section 130. Next, the second filter 127 which has been soaked in an ethanol solution and deaerated is inserted into the second storage section 810. The second filter 127 is inserted from the opening 120 of the second storage section 810 and then pressed using an insertion rod (not shown) and closely attached to the bottom surface 117.

Next, the bottom cap 400 and the top cap 600 are attached to the ends of the vise tube 500. Then, the second column 30 is inserted into the counterbored hole 601 of the top cap 600, with the stopper 310 at the head. Since the outer circumferential diameter of the stopper grip section 311 is such a length that allows engagement with the outer circumference of the reduced diameter section 601b, the stopper grip section 311 is engaged with the reduced diameter section 601b, and consequently the second column 30 is supported by the vise 10 for column and stands upright.

Figure 9:
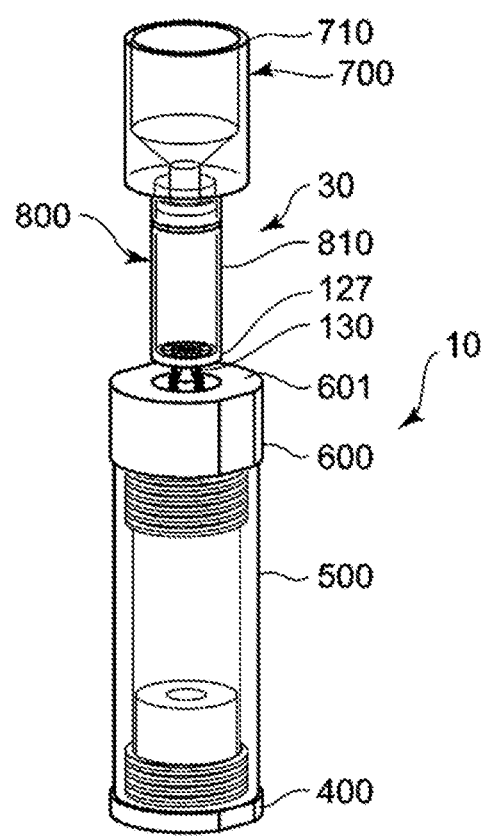
FIG. 9 is a view showing a state in which the packer is attached to a second column tube.

Next, after pouring a solvent into the second storage section 810, the packer 700 is attached to the second column tube 800 by inserting the packer lower section 720 into the second storage section 810 (see FIG. 9). Subsequently, a slurry is poured into the packer upper section 710. The slurry is obtained by suspending the filler 140 in a liquid.

Figure 10:
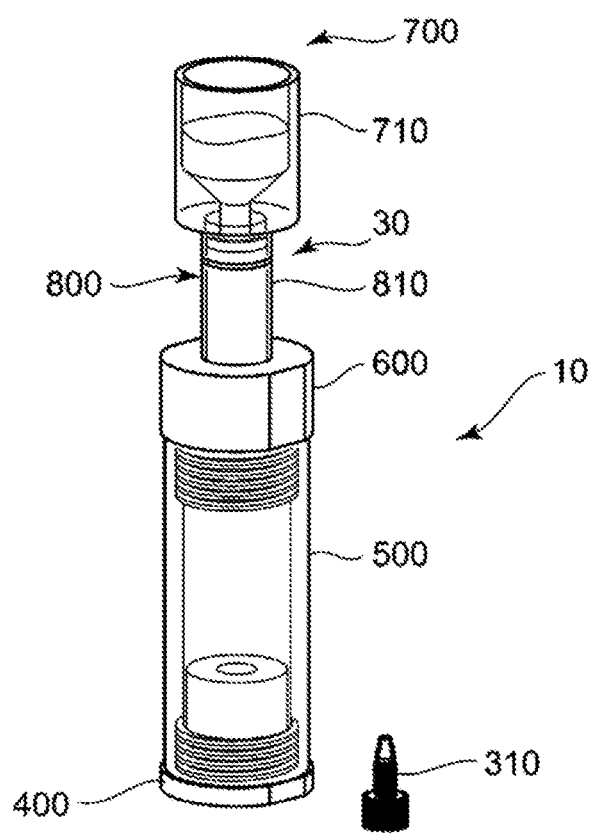
FIG. 10 is a view showing a state in which the second column tube is attached to a top cap.
Figure 11:
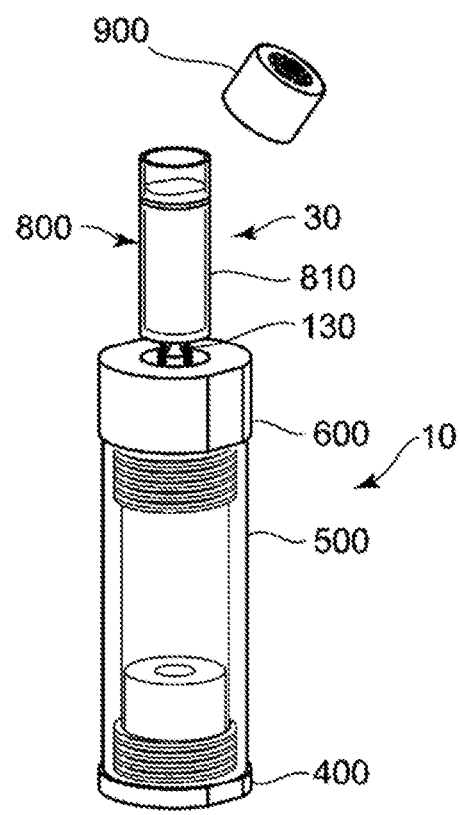
FIG. 11 is a view showing a state in which a second storage section holds a second plug.
Figure 12:
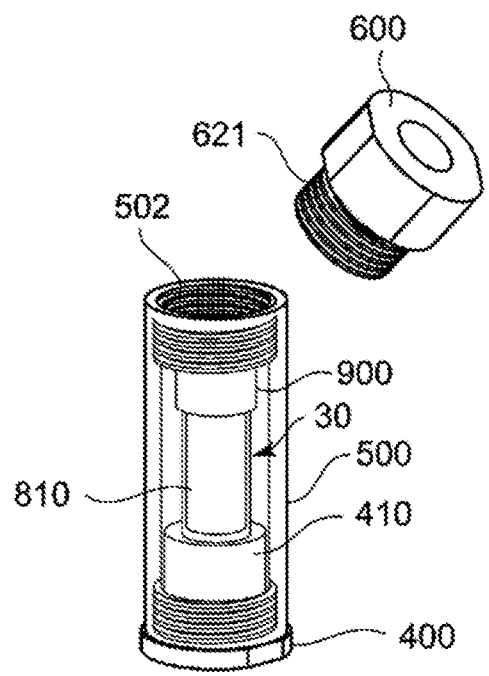
FIG. 12 is a view showing a step of attaching the top cap to a vise tube.
Figure 13:
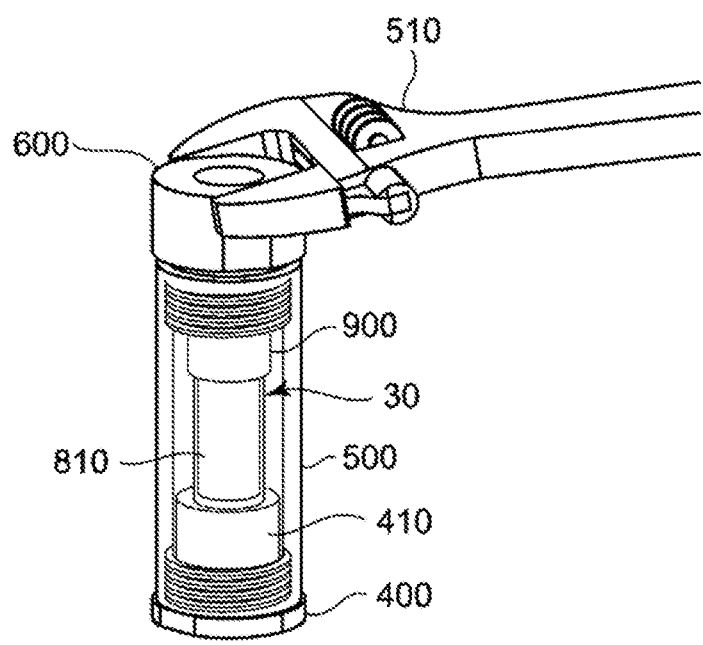
FIG. 13 is a view showing a step of attaching the second plug to the second column.

Next, after removing the second column 30 from the vise 10 for column, the stopper 310 attached to the bottom-side connecting section 130 is removed, and the second column tube 800 is inserted into the counterbored hole 601 (see FIG. 10). Here, as described above, the diameter of the outer circumference of the second storage section 810 is shorter than the diameter of the enlarged diameter section 601a and longer than the diameter of the reduced diameter section 601b, and the diameter of the outer circumference of the bottom-side connecting section 130 is shorter than the diameters of the enlarged diameter section 601a and the reduced diameter section 601b. Therefore, the bottom-side connecting section 130 is inserted into the enlarged diameter section 601a and the reduced diameter section 601b, and the second storage section 810 is inserted into the enlarged diameter section 601a. Then, the bottom surface 811 formed between the second storage section 810 and the bottom-side connecting section 130 is engaged with a step, namely a counterbore 601c, between the enlarged diameter section 601a and the reduced diameter section 601b. Thus, the second column 30 is supported by the vise 10 for column. At this time, the solvent drops into the counterbored hole 601 through the hole 118. Then, the solvent passes through the drain hole 622 and is stored in the vise 10 for column.

Further, the slurry is poured so that the packer 700 will not be empty. After elapse of a predetermined period of time, the stopper 310 is attached to the bottom-side connecting section 130, the packer 700 is removed, the first filter 126 is inserted into the second storage section 810, and the second plug 900 is inserted into the second storage section 810 (see FIG. 11). With the use of the packer 700, a predetermined amount of the filler can be poured into the second column tube 800.

Next, the stopper 310 and the bottom-side connecting section 130 are inserted into the inner circumferential surface 411 of the supporting main body 410 by inserting the second column 30 into the vise 10 for column, with the stopper 310 at the head. Here, as described above, the diameter of the outer circumference of the second storage section 810 is longer than the diameter of the inner circumferential surface 411. Therefore, the bottom surface 811 of the second storage section 810 is engaged with the top surface 414 of the supporting main body 410. Thus, the second column 30 is supported by the supporting main body 410. In this state, the top cap 600 is inserted into the vise tube 500 from above the second column 30 (see FIG. 12) to screw the male thread 621 and the female thread 502. Then, the top cap 600 is screwed into the vise tube 500 using a hand or a suitable tool 510 (see FIG. 13). At this time, the top cap 600 can be easily screwed into the vise tube 500 by engaging the tool 510 with the top tool-engagement faces 611, 612.

Consequently, the second plug 900 is pushed by the top cap 600 and is inserted into the second storage section 810. At this time, a bottom surface 922 of the second plug 900 pushes the filler 140 into the second storage section 810 through the first filter 126. While the second plug 900 is kept pushed in the second storage section 810, the solvent is discharged to the outside through the plug cylindrical section 231, the plug widened section 232 and the plug female threaded section 233. When the second plug 900 is kept pushed into the second storage section 810, the outer circumferential surface 924 is closely attached to the second plug connecting section 814. Thus, the opening 120 of the second storage section 810 is sealed. Finally, the hook 912 is engaged with the securing rib 812, and the second plug 900 is completely attached to the second column tube 800 and will not be disconnected. Thus, the second plug 900 is secured to the second column tube 800 while the filler 140 is kept packed densely in the second storage section 810. Thereafter, the stopper 310 is screwed into the second plug 900, thereby closing the plug cylindrical section 231, the plug widened section 232 and the plug female threaded section 233. Consequently, the filler 140 is densely packed in the second storage section 810, and a stationary phase is formed in the second storage section 810.

Moreover, since the air hole 602 connects the inside of the vise 10 for column and the outside, the air pressure in the vise 10 for column does not increase, and the top cap 600 can be easily screwed into the vise tube 500.

When removing the top cap 600 from the vise tube 500, the top cap 600 can be easily removed from the vise tube 500 by engaging the tool 510 with the top tool-engagement faces 611, 612 and turning the top cap 600. Similarly, when removing the bottom cap 400 from the vise tube 500, the bottom cap 400 can be easily removed from the vise tube 500 by engaging the tool 510 with the bottom tool-engagement faces 421.

Next, a procedure for assembling the first column 20 will be described. Since FIGS. 9 to 11 of the procedure for assembling the second column 30 are the same as those for the first column 20, description will be omitted.

The first column 20 is inserted into the vise 10 for column, and the bottom-side connecting section 130 is inserted into the inner circumferential surface 411 of the supporting main body 410. Here, as described above, the diameter of the outer circumference of the first storage section 110 is shorter than the diameter of the inner circumferential surface 411. Therefore, the bottom surface of the stopper 310 is engaged with the bottom surface of the hole of the supporting main body 410. Thus, the first column 20 is engaged with the hole of the supporting main body 410 and supported. In this state, the top cap 600 is inserted into the vise tube 500 from above the first column 20 to screw the male thread 621 and the female thread 502. Then, the top cap 600 is screwed into the vise tube 500 using a hand or a suitable tool. Since the subsequent procedure is the same as that for the first column 20, description will be omitted.

According to the present embodiment, by screwing the male thread 621 and the female thread 502 and converting the turning force into axial force, it is possible to more easily attach the second plug 900 to the second storage section 810 than by a method in which the second plug 900 is directly pushed in the axial direction.

As described in Japanese Patent Laid-Open No. 2005-114460, it is extremely complicated to adjust the compression ratio of the filler by screwing a union with the holder and adjusting the turning amount of the union, and an unintentional turn of the union may changes the compression ratio. Whereas, according to the present embodiment, a predetermined amount of a filler is poured into the second column tube 800 using the packer 700, and the filler is pressed with the second plug 900 to engage the hook 912 with the securing rib 812, and thus the filler can be easily packed at a desired compression ratio. Moreover, in this structure, since the hook 912 will not be easily disconnected from the securing rib 812, if the second plug 900 is once attached to the second column tube 800, the compression ratio will not change.

Furthermore, the vise 10 for column makes it possible to attach each plug to each column tube without performing special processing on the first column 20 and the second column 30. There is no need to provide parts other than a tubular container like a holder as in the invention described in Japanese Patent Laid-Open No. 2005-114460, that is, there is no need to perform special processing on the first column 20 and the second column 30, and therefore the cost of the column can be reduced.

In addition, the filler in the first column 20 and in the second column 30 does not contact the filler adhering to the outside, especially the vise 10 for column, and therefore contamination problems will not occur. Hence, the vise 10 for column can be readily used repeatedly.

By forming the bottom cap 400 and the top cap 600 of polyoxymethylene, the members to be inserted into the counterbored hole 601 and the inner circumferential surface 411 can be easily detached.

Since the vise tube 500 is colorless transparent, it is possible to visually confirm that the first plug 200 has been securely attached to the first column tube 100, and the second plug 900 has been securely attached to the second column tube 800.

Since the bottom cap 400 and the top cap 600 are removable from the vise tube 500, these members can be easily cleaned.

Since the male thread 621 of the top cap 600 is longer than the insertion length of the first plug 200 to be inserted into the first column tube 100 and the insertion length of the second plug 900 to be inserted into the second column tube 800, it is possible to reliably insert and secure the first plug 200 in the first column tube 100, and the second plug 900 in the second column tube 800, by screwing the top cap 600 into the vise tube 500.

Moreover, by providing a user with the column system for chromatography comprising the first column 20 and/or the second column 30, and the vise 10 for column, the user can readily produce the first column 20 and/or the second column 20.

It may also be possible to insert the first plug 200 into the first column tube 100 and the second plug 900 into the second column tube 800 by arranging the outer circumferential surfaces of the supporting main body 410 and the top engagement section 620 to be slidable with respect to the inner circumferential surface of the vise tube 500 and pressing down the top cap 600 into the vise tube 500 using a device such as a hand press, instead of providing the outer circumferential surfaces of the supporting main body 410 and the top engagement section 620 with the male thread 413 and the male thread 621.

The materials of the bottom cap 400 and the top cap 600 are not limited to polyoxymethylene, and any material may be used as long as the material allows easy detachment of the members to be inserted into the counterbored hole 601 and the inner circumferential surface 411.

The first column tube 100, the second column tube 800, the first storage section 110, the second storage section 810 and the bottom-side connecting section 130 need not be cylinders, and can be square tubes as long as being tubular.

The first column 20 may not include the first filter 126, the second filter 127 and the stopper 310 as long as the first column 20 comprises at least the first column tube 100 and the first plug 200. Similarly, the second column 30 may not include the first filter 126, the second filter 127 and the stopper 310 as long as the second column 30 comprises at least the second column tube 800 and the second plug 900.

The vise tube 500 is not necessarily in the form of a cylinder. At least only the inner circumference of the vise tube 500, which is screwed with the bottom cap 400 and the top cap 600, needs to have a cylindrical form, and other sections may have other form, such as a square tubular form and an oval tubular form.

The first column 20 and the second column 30 may not be made of a resin, and may be entirely or partly made of a metallic material.

The hooks 212 and 912 may be provided on the entire circumference of the inner circumferential surfaces of the outer cylindrical sections 210, 910, and the securing ribs 112, 812 may protrude intermittently instead of being provided over the entire circumference of the outer circumferential surface 111 in the circumferential direction.

The sizes of the members shown in the present description and the drawings are merely examples, and the members are not limited to these sizes. Further, the stated materials of the members are examples, and the members are not limited to these materials.

The present invention includes [1] to [12] below.

[1] A vise for column, for attaching a plug to a column tube of a column for chromatography comprising the column tube and the plug to be attached to one end of the column tube, the vise comprising: a column supporter configured to be able to support a part of the column for chromatography; a main body configured to be connected to the column supporter and extending from the column supporter by a predetermined distance; and a column presser configured to be supported at another end of the main body opposite to one end to which the column supporter is connected, and configured to be movable toward and away from the column supporter, and configured to be able to press the plug against the column tube.

[2] The vise for column described in [1], wherein the column supporter has a hole into which a bottom of the column for chromatography is insertable, and the column supporter supports the column for chromatography by insertion of the bottom of the column for chromatography into the hole.

[3] The vise for column described in [1], wherein the column supporter has a hole into which a bottom of the column for chromatography is insertable, the column for chromatography has a receptacle with an outer diameter larger than the bottom of the column, and the column supporter supports the column for chromatography by insertion of the bottom of the column for chromatography into the hole and engagement of a top surface of the column supporter with a bottom of the receptacle.

[4] The vise for column described in any one of [1] to [3], wherein the column for chromatography has a stopper to be attached to another end of the column tube, and the column presser has a hole capable of engaging with an outer circumference of the stopper.

[5] The vise for column described in any one of [1] to [4], wherein the column presser has a hole allowing the column tube to be loosely fit in the hole.

[6] The vise for column described in any one of [1] to [5], wherein the column tube has a receptacle with an outer diameter larger than a bottom of the column tube, and the column presser has a counterbored hole capable of engaging with a bottom of the receptacle.

[7] The vise for column described in any one of [1] to [6], wherein the column tube has a receptacle with an outer diameter larger than a bottom of the column tube, the column presser has a counterbored hole having a reduced diameter section allowing the bottom of the column tube to be loosely fit in the reduced diameter section, and an enlarged diameter section allowing the receptacle to be loosely fit in the enlarged diameter section, and the column supporter supports the column for chromatography by insertion of the bottom of the column tube into the reduced diameter section, insertion of the receptacle into the enlarged diameter section and engagement of a bottom surface of the receptacle with a counterbore of the counterbored hole.

[8] The vise for column described in any one of [1] to [7], wherein the main body is formed of a tube, the column supporter is attached to close an opening at one end of the main body, and the column presser is attached movably to an opening at another end of the main body.

[9] The vise for column described in any one of [1] to [8], wherein the column presser has a hole for connecting inside of the main body to outside.

[10] The vise for column described in any one of [1] to [9], wherein the main body is a cylinder, and the column supporter comprises a flange in a disk form with an outer diameter larger than an outer diameter of the main body, wherein an outer circumference of the flange has faces formed by being cut along mutually parallel two planes parallel to an axial direction of the disk form.

[11] The vise for column described in any one of [1] to [10], wherein the main body is a cylinder, and the column presser comprises a flange in a disk form with an outer diameter larger than an outer diameter of the main body, wherein an outer circumference of the flange has faces formed by being cut along mutually parallel two planes parallel to an axial direction of the disk form.

[12] A column system for chromatography comprising: a column for chromatography comprising a column tube and a plug to be attached to one end of the column tube; and a vise for column, comprising a column supporter configured to be able to support a part of the column, a main body configured to be connected to the column supporter and extend from the column supporter by a predetermined distance, and a column presser configured to be supported by the main body at an end which is not connected to the column supporter, and configured to be movable toward and away from the column supporter, and configured to be able to press the plug against the column tube.

According to the present invention, a vise for column and a column system for chromatography capable of easily and reliably assembling a column for chromatography are obtained.

Here the embodiment of the present invention has been described with reference to the accompanying drawings, but it is obvious to those skilled in the art that modifications may be made in the structures and relationships of the respective sections without departing from the scope and spirit of the described invention.

What is claimed is:

1. A vise for column, for attaching a plug to a column tube of a column for chromatography comprising the column tube and the plug to be attached to one end of the column tube, the vise comprising:
a column supporter configured to be able to support a part of the column for chromatography;
a main body configured to be connected to the column supporter and extending from the column supporter by a predetermined distance; and
a column presser configured to be supported at another end of the main body opposite to one end to which the column supporter is connected, and configured to be movable toward and away from the column supporter, and configured to be able to press the plug against the column tube,
the column tube has a receptacle with an outer diameter larger than a bottom of the column tube,
the column presser has a counterbored hole having a reduced diameter section allowing the bottom of the column tube to be loosely fit in the reduced diameter section, and an enlarged diameter section allowing the receptacle to be loosely fit in the enlarged diameter section, and
the column supporter supports the column for chromatography by insertion of the bottom of the column tube into the reduced diameter section, insertion of the receptacle into the enlarged diameter section and engagement of a bottom surface of the receptacle with a counterbore of the counterbored hole.

2. The vise for column according to claim 1, wherein the column supporter has a hole into which a bottom of the column for chromatography is insertable, and the column supporter supports the column for chromatography by insertion of the bottom of the column for chromatography into the hole.

3. The vise for column according to claim 1, wherein
the column supporter has a hole into which a bottom of the column for chromatography is insertable, and
the column supporter supports the column for chromatography by insertion of the bottom of the column for chromatography into the hole and engagement of a top surface of the column supporter with a bottom of the receptacle.

4. The vise for column according to claim 1, wherein
the column for chromatography has a stopper to be attached to another end of the column tube, and
the column presser has a hole capable of engaging with an outer circumference of the stopper.

5. The vise for column according to claim 1, wherein
the main body is formed of a tube,
the column supporter is attached to close an opening at one end of the main body, and
the column presser is attached movably to an opening at another end of the main body.

6. The vise for column according to claim 1, wherein an inside of the main body is communicated with an outside of the main body through a hole on the column presser.

7. The vise for column according to claim 1, wherein
the main body is a cylinder, and
the column supporter comprises a flange in a disk form with an outer diameter larger than an outer diameter of the main body, wherein an outer circumference of the flange has faces formed by being cut along two mutually parallel planes to an axial direction of the disk form.

8. The vise for column according to claim 1, wherein
the main body is a cylinder, and
the column presser comprises a flange in a disk form with an outer diameter larger than an outer diameter of the main body, wherein an outer circumference of the flange has faces formed by being cut along mutually parallel two planes to an axial direction of the disk form.

9. A column system for chromatography, comprising:
a column for chromatography comprising a column tube, and a plug to be attached to one end of the column tube; and
a vise for column, comprising a column supporter configured to be able to support a part of the column, a main body configured to be connected to the column supporter and extend from the column supporter by a predetermined distance, and a column presser configured to be supported by the main body at an end which is not connected to the column supporter, and configured to be movable toward and away from the column supporter, and configured to be able to press the plug against the column tube,
the column tube has a receptacle with an outer diameter larger than a bottom of the column tube,
the column presser has a counterbored hole having a reduced diameter section allowing the bottom of the column tube to be loosely fit in the reduced diameter section, and an enlarged diameter section allowing the receptacle to be loosely fit in the enlarged diameter section, and
the column supporter supports the column for chromatography by insertion of the bottom of the column tube into the reduced diameter section, insertion of the receptacle into the enlarged diameter section and engagement of a bottom surface of the receptacle with a counterbore of the counterbored hole.

* * * * *